(12) United States Patent
Jin

(10) Patent No.: US 6,266,615 B1
(45) Date of Patent: Jul. 24, 2001

(54) METHOD AND SYSTEM FOR AN INTERACTIVE AND REAL-TIME DISTRIBUTED NAVIGATION SYSTEM

(75) Inventor: HaiPing Jin, San Jose, CA (US)

(73) Assignee: TeleVigation, Inc., Sunnyvale, CA (US)

( * ) Notice: Subject to any disclaimer, the term of this patent is extended or adjusted under 35 U.S.C. 154(b) by 0 days.

(21) Appl. No.: 09/547,421

(22) Filed: Apr. 11, 2000

Related U.S. Application Data

(60) Provisional application No. 60/156,225, filed on Sep. 27, 1999.

(51) Int. Cl.⁷ .................................................. G01C 21/00
(52) U.S. Cl. ........................ 701/213; 701/201; 701/211; 340/995; 342/357.09
(58) Field of Search .................................. 701/213, 201, 701/202, 203, 207, 208, 209, 211, 214, 217, 300; 340/988, 995; 342/357.06, 357.1, 357.17, 357.09, 457, 357.13; 455/456

(56) References Cited

U.S. PATENT DOCUMENTS 5,610,821 * 3/1997 Gazis et al. .......................... 701/202
5,933,100 * 8/1999 Golding ................................ 340/995
6,107,944 * 8/2000 Behr et al. ........................... 340/995

OTHER PUBLICATIONS

International Search Report Dated Jan. 4, 2001, for International Application No. PCT/US00/27083 Filed Sep. 27, 2000.

* cited by examiner

Primary Examiner—Tan Nguyen
(74) Attorney, Agent, or Firm—Pennie & Edmonds, LLP

(57) ABSTRACT

An Interactive Real-Time Distributed Navigation system is disclosed. In the present invention a user's location is determined by generating a position signal at the user's location. Through wireless communication between the user and distributed navigation servers, the user is presented with a list of candidate locations. The user's choice from the candidate list are then used by the navigation servers to obtain an accurate measurement of the user's location. Having established a user's location, the system proceeds to provide navigational prompts to the user to reach a final destination.

26 Claims, 6 Drawing Sheets

INTERACTIVE REAL TIME DISTRIBUTED NAVIGATION SYSTEM—ARCHITECTURE A

METHOD AND SYSTEM FOR AN INTERACTIVE AND REAL-TIME DISTRIBUTED NAVIGATION SYSTEM

This application claims benefit of Provisional 60/156,225 filed Sep. 27, 1997.

FIELD OF THE INVENTION

This invention relates to navigation systems and location based information delivery. Specifically, this invention relates to a method and system for delivering interactive and real-time navigational information using distributed navigation information processing.

BACKGROUND OF THE INVENTION

Many navigation systems are based on satellite-based global positioning system (GPS) devices which have been applied in automobile navigation systems, see, e.g., U.S. Pat. Nos. 5,938,720, 5,928,307, 5,922,042, 5,912,635, 5,910,177, 5,904,728, 5,902,350, all incorporated herein by reference for all purposes. Such automobile navigation systems, however, are expensive and inconvenient to use. Many such systems are further not appropriate for walking. Therefore, there is a great need in the art to incorporate navigation systems in personal handheld devices.

However, there are several technical obstacles that prevent the incorporation of navigational capabilities in handheld devices for providing turn-by-turn real-time navigation services. One such obstacle is the amount of geographic data needed to provide reasonably detailed navigational information. Small handheld devices include cellular phones, personal digital assistants, or computers, however, the amount of embedded memory is limited and is impractical to store a large amount of geographic information. In existing automobile navigation systems, GPS systems are employed to provide information about the location and movement of a user. Geographic information is usually stored in a geographic mapping database stored on a CD-ROM, hard-disk drive device or other large capacity storage medium.

Another obstacle is that the lack of information processing power of small devices such as those mentioned above. For example, the information processing power of a cellular telephone is typically provided by an embedded microprocessor with limited memory. While the information processing power of embedded microprocessors is generally increasing, such processors are still not suitable for processor intensive real-time navigational tasks.

An additional obstacle is the insufficient location accuracy provided by current technology. Initial sources of inaccuracy of the GPS based systems, for example, are either imposed by the U.S. Department of Defense through Selective Availability (S/A), other sources of error are due to atmospheric and timing errors limiting the accuracy of a single GPS receiver to +/−50 meters. Methods exist which can be used to enchance accuracies to +/−5 meters. Such methods include Enhanced GPS systems (i.e., SnapTrack) and network based system (i.e., Truepoint). These methods use a known position, such as a survey control point, as a reference point to correct the GPS position error. These methods of correcting GPS positions are referred to as Differential GPS or DGPS. The DGPS corrections can be applied to the GPS data in real-time using data telemetry (radio modems). Toward expanding the use of DGPS, the United States and Candian Coast Guard are establishing a series of radio beacons to transmit the DGPS corrections for accurate navigation along the Great Lakes, the Mississippi River and tributaries, the Gulf Coast,and the Eastern and Western coasts of North America. However, such radio beacons are not available to consumers traveling in most inland locations.

Location information that is ambiguous due to a number of factors discussed above makes navigational systems difficult to develop. For example, if the user is driving in a downtown area with streets spaced close together, a GPS location within +/−50 meters is not adequate to give turn-by-turn directions. The GPS location information is thus considered ambiguous and inappropriate for navigation systems. In other situations, a GPS location within +/−50 meters is adequate for navigation purpose. For example, if a user is driving on a highway in a remote area without any nearby exits, the GPS location is sufficient for calculating further navigation directions. Thus, in such a situation, the GPS location is not ambiguous.

Current automobile GPS navigation systems make use of other sensors, such as accelerometers, speedometers, etc. plus some sophisticated filtering technology to improve the accuracy of a navigational system (see, e.g., U.S. Pat. No. 5,912,635, previously incorporated by reference for all purposes). In addition, many automobile-based navigational systems use map-aiding technology as well. However, for a navigational system implemented using handheld devices such as cellular telephones, it is impractical to have the handheld devices connected to external sensors, especially when the device is used while walking.

Accordingly, it would be desirable to provide a navigational system that provides accurate navigational instructions. It would further be desirable to provide a navigational system that can be implemented on an existing infrastructure and is adaptable to new infrastructures as they become available.

It would further be desirable to provide a navigational system that can be implemented on handheld devices with limited computational power as well as devices with enhanced computational power.

It would further be desirable to provide a navigational system that can make use of many forms of real time information to provide accurate location calculations as well as optimal navigation paths.

SUMMARY OF THE INVENTION

These and other objects are provided for by a system and method for interactive real-time distributed navigation. In an embodiment of the invention, a user advantageously makes use of an often under-utilized sensor—a user's eyes. Toward reducing an ambiguity associated with a location derived from a positional sensor, the present invention prompts for and utilizes a user's input. In an embodiment, a consolidated list of candidate locations are presented to a user. A user's selection from such list is then used to correct for errors in other position detecting sensors.

In another embodiment of the invention, an enhanced and simplified dynamic real-time navigation system is provided based upon distributed computing and database systems. In such a manner, wireless devices with limited computational power interact with distributed servers that execute any necessary intensive processing. In another embodiment, geographic map information databases are advantageously stored on distributed servers with large storage capacity.

In another embodiment, depending upon the capability of a user's device, data storage and navigation calculation load are dynamically distributed between the server and the device. In an embodiment, a user sends a request to navigate from a current location (or point A) to point B. A server, after receiving the request (including destination information) and user's location, the system of the present invention generates a global navigation route across several small geographic areas. The server then sends navigational information relating to a first small geographic area to the user's device. Once the user moves out of the first small geographical area, the information will be updated by the server either at the request of the user's device or initiated by the server based upon the location of the user.

Another aspect of the invention provides navigation guidance based on real-time traffic conditions. The traffic information can be obtained from a group of navigational service users, by observing their speeds and making comparisons with the nominal street speed limits in a map database. This traffic information assists the system to determine an optimal route for its users in real-time. At each juncture, the system will dynamically determine an optimal path to get to the destination based on the traffic information. The best route can be defined based on the user's request, for example, it can be either time or gas consumption which will be minimized.

Another embodiment of the invention provides directions in a queue ahead of time. This is particularly important for wireless device navigation because of the small screen. For example, the server prompts, either by voice or text, "you are going to see University Ave. in about 5 minutes (or 500 yards), where you should turn right" In the mean time, if not necessary, the communication link can be released to reduce the server traffic.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. The invention is intended to cover alternatives, modifications and equivalents, which may be included within the spirit and scope of the invention as defined by the appended claims.

As will be appreciated by one of skill in the art, the present invention may be embodied as a method, data processing system or program products. Accordingly, the present invention may take the form of navigation systems, navigation methods, navigation devices, navigation software, etc. Software written according to the present invention is to be stored in a form of computer readable medium, such as memory, or CD ROM, to be transmitted over a network, and executed by a processor.

A key component of a navigation system is the determination of the location (or position) of a user. It is intended that the term location (referred to herein as the measurement of a geographic location) includes information related to the position of an object. A location may contain three dimensional information that completely define the exact position of an object. In some embodiments, a location may contain two dimensional information to define an object in a two dimensional space. In some additional embodiments, a location may contain information that is not sufficient to completely define the position of an object Broadly defined location, as used herein, also may include speed, time, direction of movement, etc. of an object.

One skilled in the art would appreciate that the format of location information is not critical to some embodiments of the invention. For example, in some embodiments, location information is presented in the format of (x, y), where x and y are two ordinates define the geographic location of an object, i.e., a user.

Figure 2:
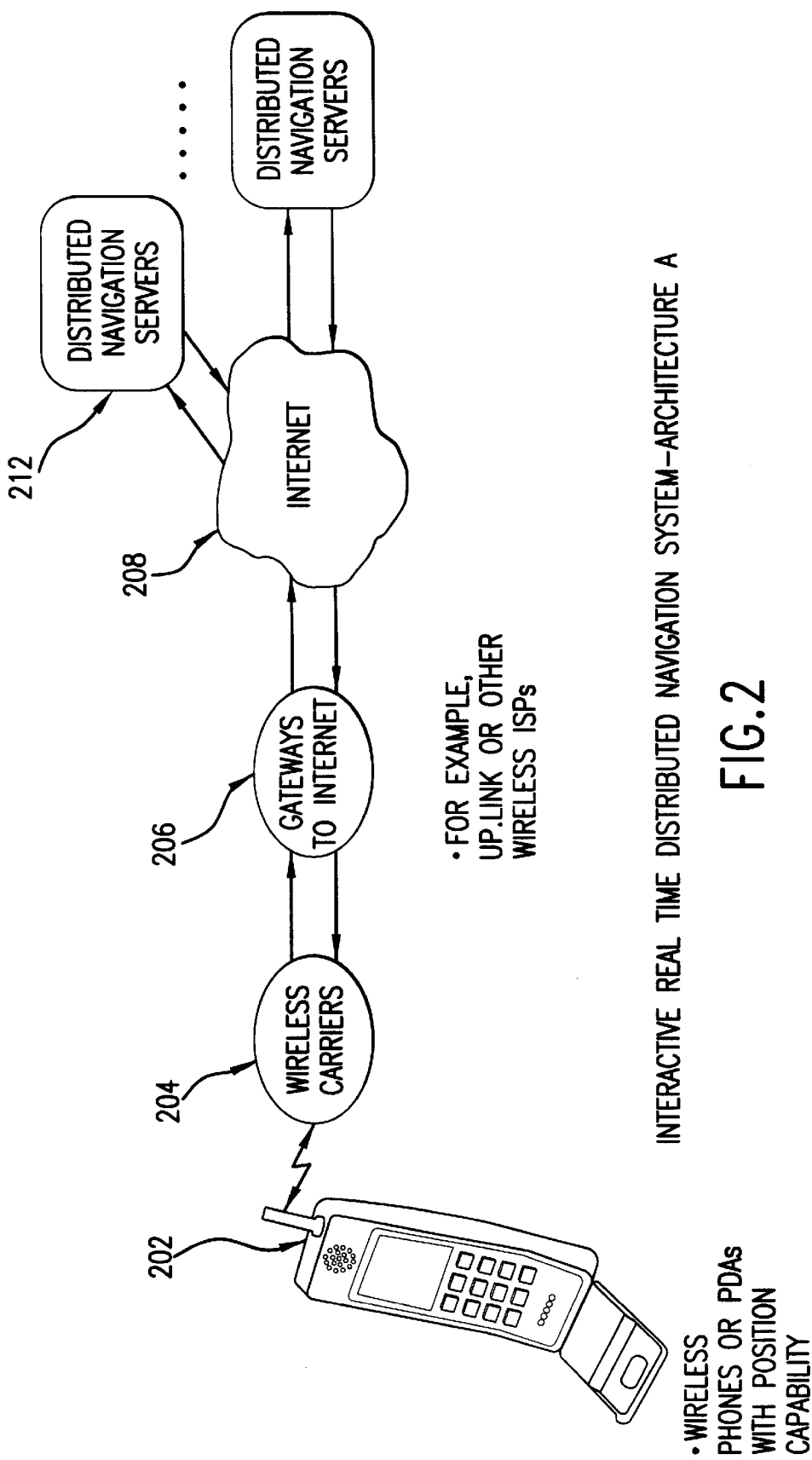
FIG. 2 is a schematic showing an embodiment of the Interactive Real-time Distributed Navigation System—Architecture A (Internet)

FIG. 2 shows an architecture for an Interactive Real-Time Distributed Navigation System in accordance with a preferred embodiment. The various components and their interaction will now be described. It is to be understood that where like numerals are used in different figures, such like numerals refer to the same item. Wireless device 202 may take the form of a cellular telephone, satellite telephone, wireless Personal Digital Assistant (PDA), personal computer or other suitable device having wireless communications capability. Wireless device 202 is equipped with positioning capability that takes the form of, for example, global positioning systems (GPS), emergency 911 (E911) location, or some other positioning systems as they become available. One skilled in the art will appreciate that the present invention is not limited to any particular positioning technology. In an embodiment, wireless device 202 is manufactured with built-in positioning capabilities.

Advantageously, wireless device 202 does not need to carry map information, can carry a predetermined amount of map information, depending on the wireless device's 202 storage capability. Such a system is described as a distributed system and will be further discussed below.

In an embodiment, the capabilities of wireless device 202 are enhanced through interfacing with modular attachments. A major function of wireless device 202 is to provide an interface between the invention and a user. Furthermore, as will be described more fully below, wireless device 202 provides a user interface 205 for displaying graphical, textual or audible information. User interface 205 incorporates the user's sensory capabilities within the invention. User interface 205 is used to allow user interaction with electromechanical components of the invention. Such interaction is used to improve the positioning accuracy of the invention where interaction achieved through text, graphics or audible signals are within the scope of the invention.

Because wireless device 202 is capable of relaying information to a user by means of audible signals or through text messages displayed on wireless device 202, embodiments of the invention make use of audible sound producing devices, as well as, text displaying devices. Where a text displaying device is used, enhanced performance is achieved through a wireless device 202 capable of displaying several lines of text. An enhanced video display is also appropriate for wireless device 202 as maps and enhanced directional information are displayed on such devices. In another embodiment, wireless device 202 is directionally oriented through gyroscopic or geomagnetically enhancements, which are then used by the device or server to provide real time position and orientation information. One of skill in the art realizes that many more implementations are possible for wireless device 202 without deviating from the teachings of the invention.

As further shown in FIG. 2, wireless carrier 204 provides wireless connectivity between wireless device 202 and distributed navigation servers 212 to be described further below. Examples of wireless carrier 204 include cellular telephone carriers, satellite communications carriers or global positioning system carriers. In achieving wireless connectivity, wireless carriers provide an existing in a structure for the wireless devices and distributed navigation servers. In an embodiment, GPS is used along with the government imposed selective availability. One with skill in the art will understand that where such limitation is removed, the present invention can further be enhanced. Because of the adaptive interaction with the user, information ranging from general to very specific is relayed to the user for a wide range of navigational applications.

While keeping within the teachings of the invention wireless carrier 204 provides positioning information such as through GPS, E911 or other positioning systems. Alternatively, positioning information is obtained through a third party and is then used by wireless carrier 204. For example, wireless service resellers, wireless internet service provides (ISPs), or satellite wireless carriers, among others, provide the services necessary to practice the invention. Importantly, wireless throughput and bandwidth continues to increase through the advent of digital transmission and through other techniques. Analog (i.e., AMPS) systems provide for a certain level of service. However, more advanced digital transmission techniques, such as, but not limited to GSM, TDMA, CDMA, provide higher data throughput. At the time of the invention, CDMA provides the highest throughput of information, however, it is expected that wireless technology will further be developed. Because of its broad application, the present invention is appropriate for these and many other transmission techniques. In an embodiment of the invention, wireless carrier 204 receives analog or digital information from the wireless device 202 and directs such information to other components of the invention. Similarly, wireless carrier 204 receives information from components of the invention and then directs such information to wireless device 204.

As shown in FIG. 2, wireless carrier 204 is connected to gateway 206 which provides an interface to network 208. Gateway 206 is provided by, among others, wireless carriers, ISPs, or other telecommunications providers. In an embodiment of the invention, network 208 is the Internet. The Internet provides advantages because it is a widely distributed network reaching many areas of the world. In another embodiment, network 208 is implemented as a proprietary network. By implementing a specialized network, network 208 may be customized to provide minimal latency and optimal performance.

As shown in FIG. 2, a plurality of distributed navigation servers 212 are incorporated as part of the invention by communicating using network 208. Distributed navigation servers 212 store street map information and point of interest information and further perform processing tasks. In this manner, wireless device 202 is not burdened with carrying all the necessary information for proper navigation. In an embodiment, distributed navigation servers 212 also process location specific information such as real-time traffic information. In an embodiment, traffic information is obtained from a group of navigation service users. By observing and comparing their positions, speeds and times, and making further comparisons with nominal street speed limits in a map database, real-time traffic information is generated and then used by the invention. At each juncture towards a destination, the system dynamically determines the optimal route for a particular user responsive to ever changing conditions. For example, where due to changed conditions a first route becomes less optimal, a second route is generated and presented to a user. An optimal route is determined in several ways depending on a user's preference. For example, an optimal route can be based on minimum time, minimum distance or minimum consumption of fuel. Processor intensive functions such as navigation guide algorithms are processed by distributed navigation servers 212 so as to reduce the computational burden on wireless device 202. As part of the processing function of distributed navigation servers 212, in an embodiment, these servers provide conversion functions such as between HDML or WML to HTML and vice versa.

Figure 3:
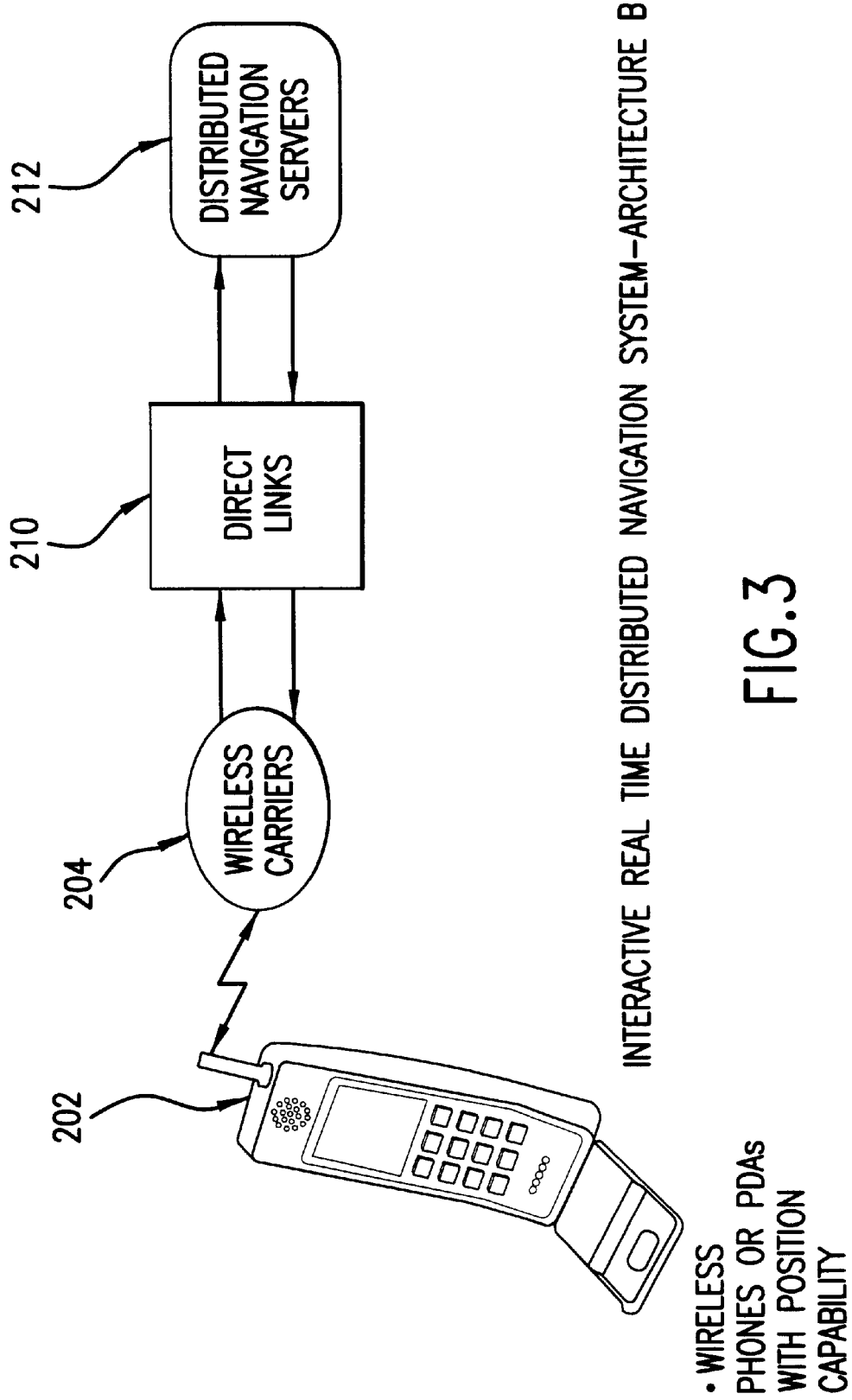
FIG. 3 is a schematic showing another embodiment of the Interactive Real-time Distributed Navigation System—Architecture B (Direct links)

An alternative embodiment for the system architecture of the present invention is shown in FIG. 3. As shown in FIG. 3, wireless device 202, wireless carrier 204 and distributed navigation servers 212 are substantially the same as described for FIG. 2. Direct links 210, however, provide an alternative embodiment to the function of gateway 206 and network 208 of FIG. 2. The direct link architecture is applicable where Internet infrastructure is not well established or fast response is desired for user navigation or other location specific information services. Illustratively, TI, Frame Relay, etc. linked by a LAN or WAN are appropriate for direct links 210. In another embodiment, direct links 210 are implemented as dedicated lines. Alternatively, direct links 210 are implemented as hard wired connections between wireless carrier 204 and distributed navigation servers 212 where wireless carrier 204 and distributed navigation servers 212 are collocated in a central office.

Figure 6:
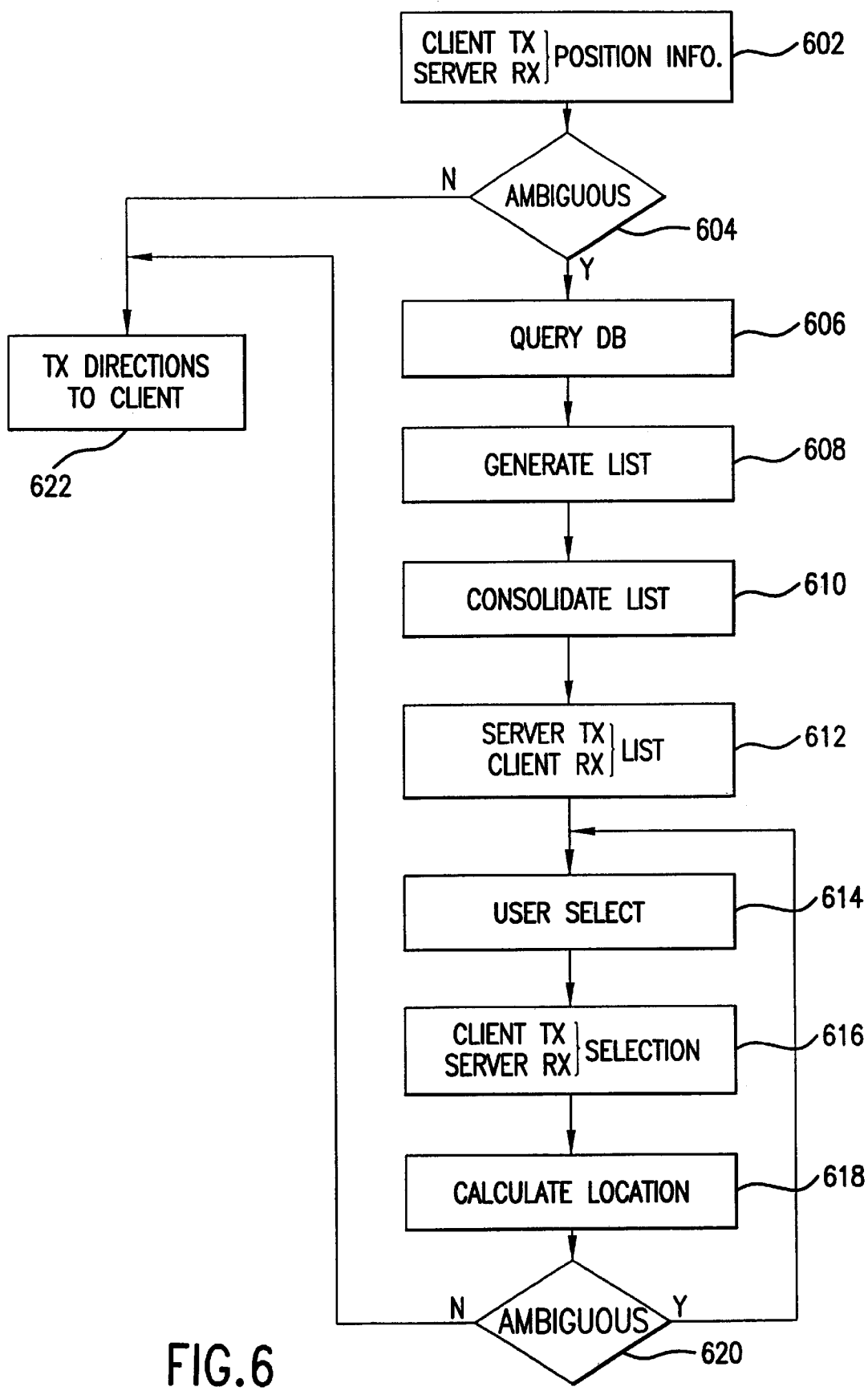
FIG. 6 is a flowchart of a method for navigation according to the invention.

FIG. 6 shows steps of an interactive real-time distributed navigation system in accordance with a preferred embodiment. At step 602 a client transmits position information to a server and a server receives such information. In an embodiment, the client is a device such as wireless device 202 discussed with reference to FIG. 2. The server is a device such as distributed navigation server 212 also discussed with reference to FIG. 2. At step 604 a determination is made as to whether the position information is ambiguous. If the position information is not ambiguous, the server determines proper directions to a destination which are then transmitted by the server and received by the client at step 622.

A location contains various degrees of inaccuracies. For example, most GPS receivers can provide location information accurate to within a range of approximately 50 meters, i.e., an inaccuracy of around 50 meters. There are a number of known factors that may affect the accuracy of a location determination. Weather conditions may affect the accuracy of a GPS location determination. In an embodiment of the invention, a location, in addition to information defining the position of an object, is also associated with an estimated error and a range. One of skill in the art appreciates that the error of a positioning system is estimated based upon the characteristics of the positioning device and other factors including weather and transmission conditions.

Whether or not a location is ambiguous may be dependent upon many factors including, but not limited to: the accuracy associated with the location; attributes of a road network; recent traveling history; and map accuracy.

In general, the more accurate a location, the less likely it is ambiguous. The attributes of a road network, such direction, turns, etc., can be useful in removing ambiguity. Illustrations are helpful: if one is traveling in on a highway in a remote area without any exits, a location associated with error of around 50 meters is not ambiguous for navigation purpose, because the navigation direction will be "going along the highway". Contrasingly, a location associated with an error of 50 meters is ambiguous if the location is within a business district of a downtown urban area where street blocks are less than 10 meters away. In an embodiment of the invention, whether a location is ambiguous is also dependent upon traffic regulations and traffic conditions. For example, if there are only two roads (Road A and B) within the range of a location (location+/−error), where the user is travelling at a speed of 55–80 miles/hr and road A has speed limit of 25 miles per hour, the location is unambiguous for the purpose of navigation because the user's location can be determined to be on Road B with a high degree of confidence.

A user's recent travel history is utilized in an embodiment of the invention to reduce ambiguity, for example, by performing a pattern recognition analysis of the user's travel history within a particular area. Illustratively, a user's travel history may be recorded or logged over a predetermined time and used in an auto-regressive manner.

Returning to the discussion of FIG. 6, if at step 604, the position information is determined to be ambiguous, further novel steps are taken to remove ambiguity of position information. With the received ambiguous position information in conjunction with an associated error for a particular positioning system in use, a query is made of a map database at step 606. From the query at step 606, a list is generated at step 608 of various candidate locations. In an embodiment of the invention, the candidate locations of step 608 are associated with notorious attributes such as landmarks, buildings, street intersections or street names, etc. One of skill in the art appreciates that various types of database structures can be useful for implementation with an embodiment of the invention. The aforementioned patents incorporated by reference also serve to demonstrate existing databases, search methods, and algorithms.

The list generated at step 608 may be unwieldy for purposes of displaying on wireless device 202 where such device has a small screen Therefore, at step 610, the candidate list is consolidated to a smaller list. Illustratively and without limitation, a list of 400 candidate locations ("candidates") is too large to display on an LCD screen of a typical cellular telephone or personal digital assistant Through step 610, however, a shortened consolidated list is generated that can easily be displayed on a small screen. Known statistical and predictive methods are used to reduce the candidate list to only those candidates with a high probability of being a true location. Furthermore, historical or auto-regressive information may be used to further consolidate the list. In an alternative embodiment, a consolidated list is ranked based upon a probability of being closest to the user.

At step 612, the server then transmits and the client receives the consolidated list. At step 614, a user is incorporated into the present invention by sensing his surroundings and then selecting an appropriate choice from among the consolidated list presented on the client such as wireless device 202. This invention fully utilizes existing sensors—user's eyes and other human senses—to improve the accuracy of the position determination of the present invention. Through the user's sensory perception, the user interacts with the present invention to enhance the quality of its navigational directions. In this way, the user incorporates his eyes to confirm the navigation guide from the system. For example, when the user requests navigational guidance from the server, the server will compare the direct location measurement with a map. Because of the location determination accuracy is typically ambiguous, the user's true location may be different from what the location measurement indicates. Therefore, the navigation system of the invention employs user's eyes are used as additional sensors to the whole system to improve the location determination accuracy and navigation quality.

Illustratively and without limitation, at step 614, the user selects the closest landmark to assist the server in locating the user accurately. In another embodiment, a user is asked to select a candidate location in specified direction. An illustrative prompt is "Please select a candidate location directly in front of you." In yet another embodiment, a user is asked to select multiple locations. Illustratively, a user is asked to pick 3 locations around him, such that averaging or triangulation techniques are available at step 618 to be discussed below. One of skill in the art appreciates that location information can be derived from the user and a user selection in other appropriate manners without deviation from the invention.

In embodiments of the invention, user interaction at step 614 is done audibly or textually. At step 616, the user selection is then transmitted by the client and received by the server. At step 618, an improved user location is calculated using the user selection information in several ways without deviating from the invention. In an embodiment, a user's locations is calculated based on the location of the user's selection. Alternatively, the user's location is calculated as a function of both the location of the user's selection and the ambiguous location determined by a location sensor. One of skill in the art will appreciate that there are other methods of calculating the location of a user.

At step 618, a digital filtering processes is used to determine calculate a user's location. In this manner, the interaction with the user is only necessary when the confidence level of the server in determining the user location is below a predetermined level. A confidence level is obtained by comparing the processed location to a map database. If an ambiguity exists at step 620, the steps 614–620 are repeated until an ambiguity no longer exists.

Having determined a location that is not ambiguous, at step 622, the server transmits appropriate navigational directions to the client and the client receives such directions and displays them to the user on wireless device 202.

Figure 4:
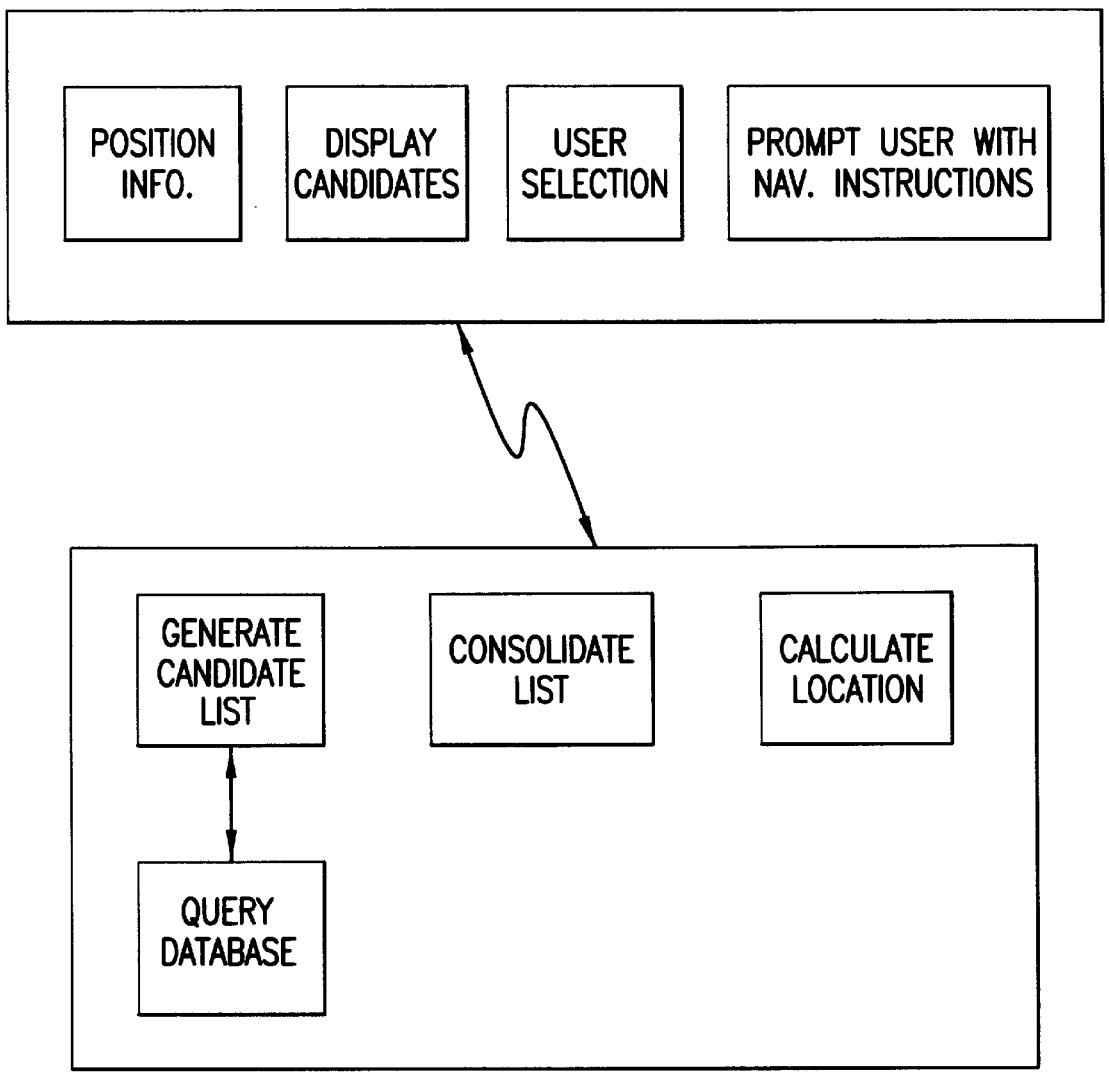
FIG. 4 is a schematic showing an embodiment of the interactive real-time distributed navigation system of the invention.
Figure 5:
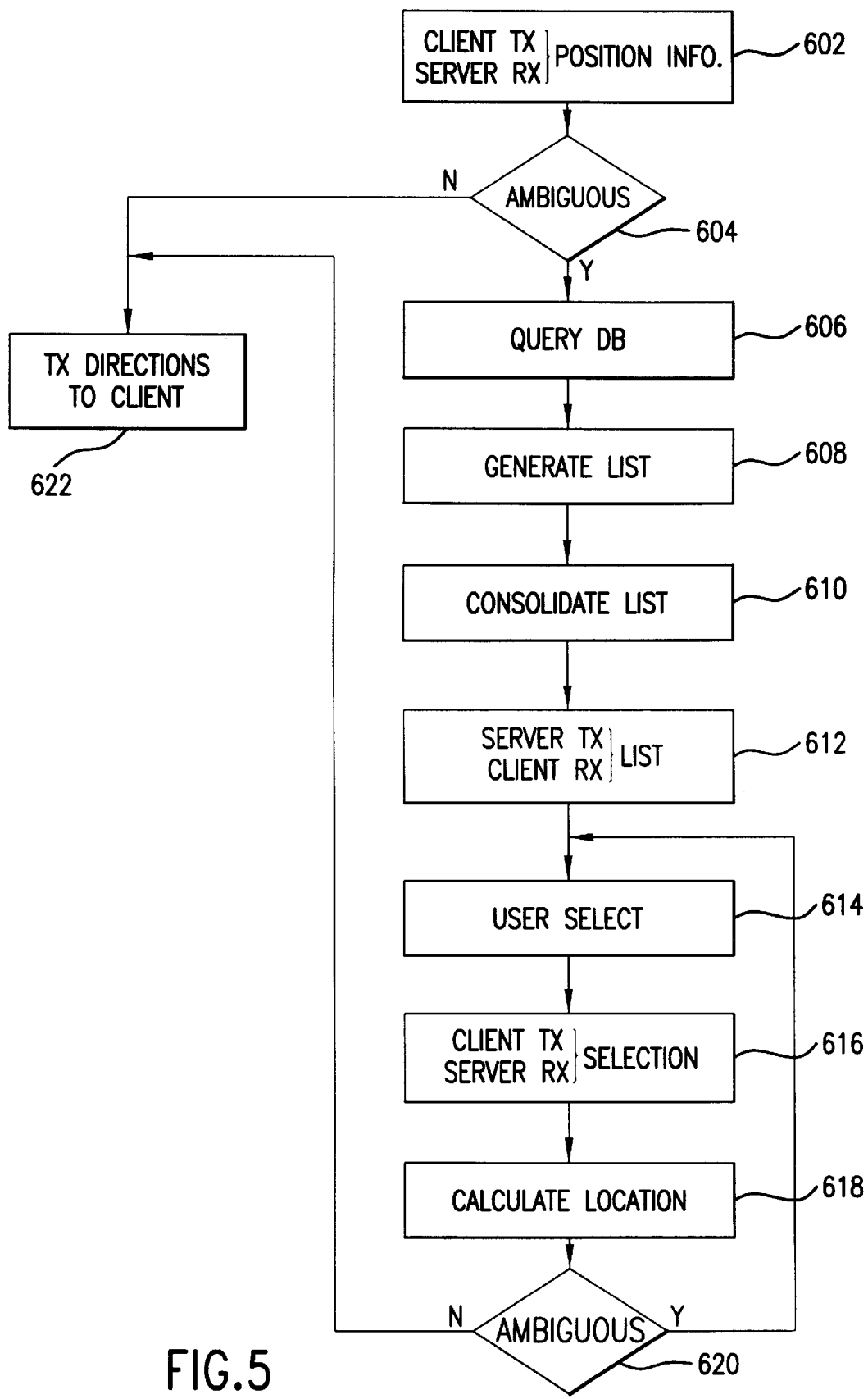
FIG. 5 is a schematic showing a method for navigating according to the invention.

E. FIG. 4–Distributed System

FIG. 4 shows an embodiment of how tasks are distributed between a client wireless device 202 (i.e., cellular telephone, PDA, or GPS receiver) and distributed navigation server 212 (see FIG. 2) in accordance with the method of FIG. 6. Advantageously, because of the distribution of tasks, wireless device 202 is implemented as a device of reduced size and weight thereby making it appropriate for driving as well as walking. At wireless device 212, step 602 is performed to generate position information of the user which is then communicated over a wireless medium to server 212 where step 604 is performed to determine whether the user's position information is ambiguous. If it is, server 212 then queries a database (step 606) of map information to generate a list (step 608). After consolidation (step 610), the consolidated list is then transmitted (step 612) over the wireless medium to the client wireless device 202, where it is displayed. After observing his surroundings, the user makes a selection (step 614) from the candidate list on wireless device 202. Such information is then transmitted (step 616) to the server where it is used to calculate an improved location (step 618). When the server 212 determines that the location is no longer ambiguous (step 620), the server prompts the user with navigational instructions (step 622).

In the description of FIG. 6 and 4, an embodiment was described wherein the user wireless device 202 (see FIG. 2) is of limited processing and storage capability such that various steps were described as being performed by distributed servers 212. In this manner, wireless device 202 is implemented as a device with limited computational power where processor intensive tasks are distributed among the servers 212 One of skill in the art, however, appreciates that the method of the present invention is also appropriate on a wireless device 202 with enhanced capabilities. Illustratively and without limitation, where wireless device 202 contains an enhanced processor, memory, and high capacity storage space (i.e., hard drive), the steps of FIG. 6 described as being performed by the server, may be allocated to be performed at the client (i.e., wireless device 202). In such an embodiment, one of skill in the art will also appreciate that the client to server and server to client transmissions are appropriately reallocated. Furthermore, one of skill in the art appreciates that many different distributions of tasks remain within the scope of the invention.

Figure 1:
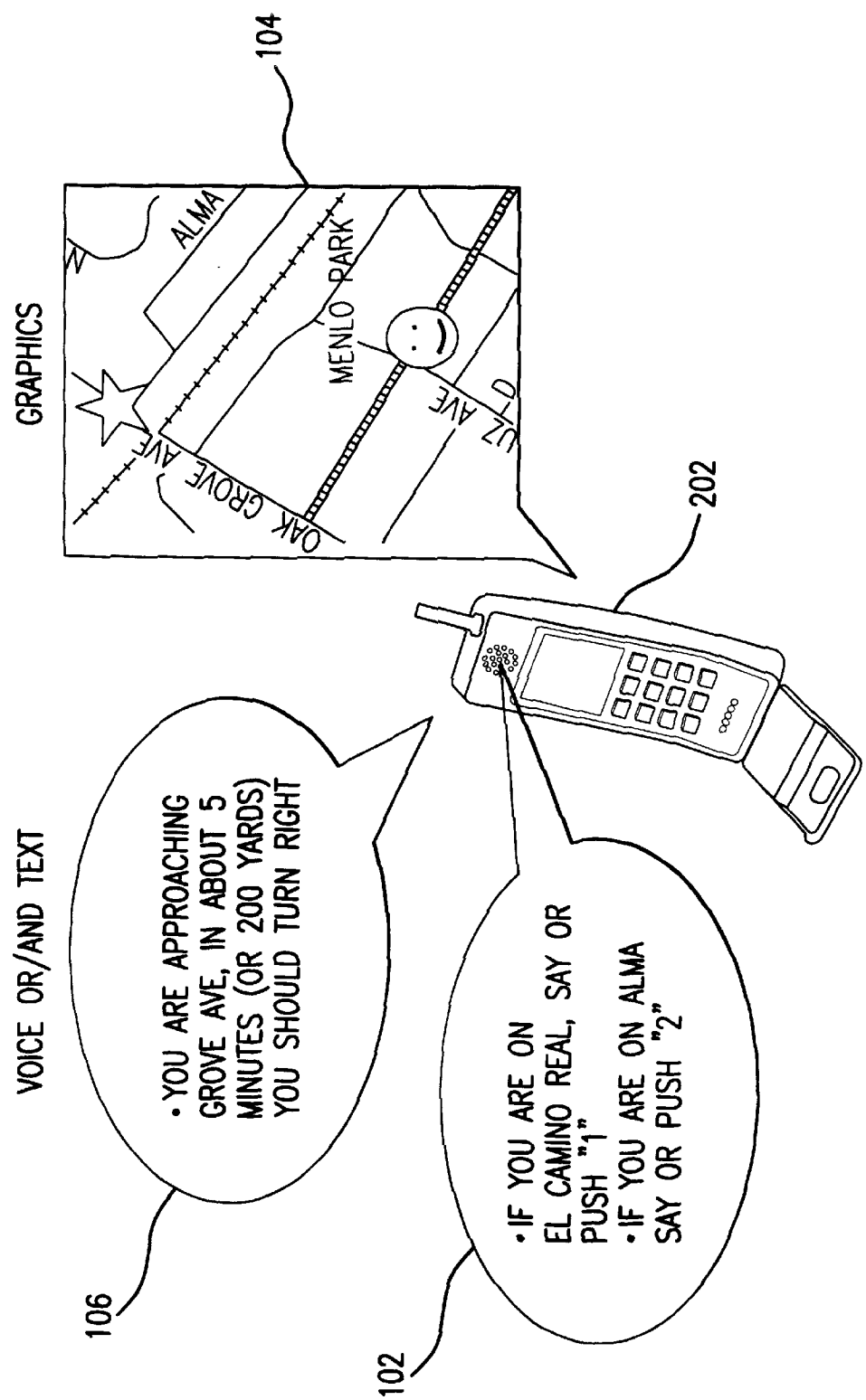
FIG. 1 is a schematic showing One Embodiment of the Interactive Real-time Distributed Navigation System—User end.

With an understanding of the architecture and method of the present invention, a user's session with an embodiment of the present invention will now be described with reference to FIG. 1. In FIG. 1, wireless device 202 is implemented as a cellular telephone with a graphics display. Illustratively, wireless device 202 will be described in voice mode, but one of skill in the art will understand that the invention can be implemented in a text mode of operation. In a voice mode of operation, the system is implemented with voice recognition as well as grammar design capabilities. In an embodiment, the user begins a session with the invention by speaking into the device to provide a destination. With the destination information, the system the implements the method of the invention as described in FIG. 6. The system obtains position information and determines whether a position is ambiguous (steps 602–604). Upon querying the, generating a list, and consolidating a list, the system presents a list of selections to the user (steps 606–612). In the voice mode of operation being described here, the system may present a section as shown in text bubble 102 where the system synthesizes a voice to say, "If you are on El Camino Real, say or push 1; if you are on Alma say or push 2." In the present example, the user observes his surroundings by reading a street sign. Assuming the user is on El Camino Real, the user says "1" to indicate the same. After appropriate processing as described for steps 614–622 of FIG. 6, the system removes the ambiguity of a user's location and correctly prompts him as shown in text bubble 106 by stating "You are approaching Grove Avenue, in about 5 minutes (or 200 yards) you should turn right." In this manner, the system provides a navigational guide ahead of time, so the user can use his/her eyes to confirm the navigation guide from the system.

In another embodiment, wireless device 202 is provided with an enhanced graphics display such that graphics 104 is displayed on the device. With such an enhanced display, navigational prompts are further provided. For example, after determining a user is on El Camino, the user may be audibly told "You are on El Camino; follow the arrows on the display to reach your destination." Illustratively, a direction arrow is displayed on the user device that provides instructions to the user as to where to proceed.

In another embodiment, where wireless device 202 is equipped with directional capabilities such as through the use of a gyroscope or geomagnetic sensing, the system provides real-time directional as well as navigational information. Illustratively, the system determines that the user must proceed north and the user is facing north, a device display shows an upward pointing arrow indicating that the user should proceed straight ahead. However, where the user must proceed north and he is facing south, the device display shows a downward pointing arrow indicating that the user should proceed backward or, more reasonably, turn around to face north and then proceed. In another implementation with a more enhanced display, more detailed and broader map information is displayed with more stylistic prompts to the user.

The invention further allows for the wireless device to be connected to an accessory display. For example, a wireless device 202 appropriate for walking is enhanced by interfacing with device with additional features such as a car-mounted display or portable computer to become better equipped for automobile navigation. In certain embodiments of the invention, the accessory device provides, without limitation, enhanced display capabilities, enhanced memory capacity, increased computational power, or increased throughput.

The foregoing descriptions of specific embodiments of the present invention have been presented for purposes of illustration and description. They are not intended to be exhaustive or to limit the invention to the precise forms disclosed. Many modifications and variations are possible in light of the above teachings without deviation from the scope of the claims set out below. The embodiments were chosen and described in order to best explain the principles of the invention and its practical application, to thereby enable others skilled in the art to best utilize the invention and various embodiments with various modifications as are suited to the particular use contemplated.

What is claimed is:

1. A method for determining a user's location comprising the steps of:

generating a position signal;

determining a first approximation of the user's location using said position signal;

querying a database of location information based upon said first approximation;

generating a first set of candidates corresponding to locations in close proximity to the first approximation of a user's location;

the user perceiving a vicinity of the user;

the user selecting at least one preferred candidate from among the first set of locations according to a predetermined criteria;

determining a second approximation of a user's location based upon said at least one preferred location, wherein said second approximation is more accurate than said first approximation.

2. The method of claim 1, wherein said predetermined criteria is said preferred location being closest to the user.

3. The method of claim 1, wherein said predetermined criteria is said preferred location being in front of the user.

4. The method of claim 1, wherein said step of generating a position signal uses a satellite based system.

5. The method of claim 4, wherein said satellite based system is a global positioning system.

6. The method of claim 1, wherein said step of generating a position signal uses a ground based system.

7. The method of claim 6, wherein said satellite based system is a cellular system.

8. The method of claim 1, wherein the steps are distributed among a client and a server.

9. The method of claim 1, wherein said step of generating a position signal uses a wireless client.

10. The method of claim 1, wherein said step of generating a first set of candidates further involves the step of ranking the first set of candidates locations based upon a second criteria.

11. A method for providing navigational prompts to a user comprising the steps of:
inputting a destination;
generating a position signal;
determining a first approximation of a user's location using said position signal;
querying a database of location information based upon said first approximation;
generating a first set of candidates corresponding to locations in close proximity to the first approximation of a user's location;
the user perceiving a vicinity of the user;
the user selecting at least one preferred candidate from among the first set of locations according to a first predetermined criteria;
determining a second approximation of a user's location based upon said preferred location, wherein said second approximation is more accurate than said first approximation;
determining a path from the second approximation to the destination according to a second predetermined criteria;
providing prompts to the user describing said path.

12. The method of claim 11, wherein said first predetermined criteria is said preferred location being closest to the user.

13. The method of claim 11, wherein said first predetermined criteria is said preferred location being in front of the user.

14. The method of claim 11, wherein said step of generating a position signal uses a satellite based system.

15. The method of claim 14, wherein said satellite based system is a global positioning system.

16. The method of claim 11, wherein said step of generating a position signal uses a ground based system.

17. The method of claim 16, wherein said satellite based system is a cellular system.

18. The method of claim 16, wherein the steps are distributed among a client and a server.

19. The method of claim 11, wherein said step of generating a position signal uses a wireless client.

20. The method of claim 11, wherein said step of generating a first set of candidates further involves the step of ranking the set of candidates locations based upon a second criteria.

21. The method of claim 11, wherein said navigational prompts are descriptive relative to a reference location.

22. The method of claim 11, wherein said navigational prompts are relative to a user's direction.

23. The method of claim 11, wherein said navigational prompts are provided audibly.

24. The method of claim 11, wherein said navigational prompts are provided graphically.

25. The method of claim 11, wherein said first predetermined criteria is candidates surrounding the user.

26. The method of claim 11, wherein said steps of inputting a destination is performed audibly, the user selecting at least one preferred candidate from among the first set of locations according to a first predetermined criteria, or providing prompts to the user describing said path are performed audibly.

* * * * *